United States Patent [19]

Hsu et al.

[11] Patent Number: 4,759,955

[45] Date of Patent: Jul. 26, 1988

[54] PROTECTIVE, DECORATIVE AND RESTORATIVE COATING COMPOSITION AND METHOD

[75] Inventors: Grace F. Hsu, Issaquah; Richard C. Colonel, Renton, both of Wash.

[73] Assignee: The Boeing Company, Seattle, Wash.

[21] Appl. No.: 822,395

[22] Filed: Jan. 27, 1986

Related U.S. Application Data

[60] Continuation-in-part of Ser. No. 735,595, May 20, 1985, which is a division of Ser. No. 537,335, Sep. 29, 1983, Pat. No. 4,529,487.

[51] Int. Cl.⁴ .............................................. B32B 35/00
[52] U.S. Cl. ................................... 427/140; 428/520; 427/393.5
[58] Field of Search .......................... 427/393.5, 140; 428/520

[56] References Cited

U.S. PATENT DOCUMENTS

| | | | |
|---|---|---|---|
| 2,069,983 | 2/1937 | Ubben | 526/329.7 |
| 2,704,726 | 4/1956 | Anderson | 526/329.7 |
| 2,934,510 | 4/1960 | Crissey et al. | 260/31.8 |
| 2,949,383 | 8/1960 | Blake | 526/329.7 |
| 3,011,909 | 12/1961 | Hart et al. | 560/205 |
| 3,362,844 | 1/1968 | Christenson et al. | 526/329.7 |
| 3,849,176 | 11/1974 | Asano et al. | 29/195 |
| 4,086,113 | 4/1978 | Cataffo et al. | 427/140 |
| 4,121,016 | 10/1978 | Garrison | 524/180 |
| 4,121,025 | 10/1978 | Scott | 524/189 |
| 4,133,913 | 1/1979 | Moore | 427/140 |
| 4,180,598 | 12/1979 | Emmons | 560/205 |
| 4,184,991 | 1/1980 | Scheurman, III | 260/29.6 MN |
| 4,274,933 | 6/1981 | Kamada et al. | 204/159.24 |
| 4,317,857 | 3/1982 | Kanda et al. | 428/334 |
| 4,343,728 | 8/1982 | Eschwey et al. | 523/456 |
| 4,357,396 | 11/1982 | Grunewalder et al. | 428/626 |
| 4,407,899 | 10/1983 | Hara et al. | 428/626 |
| 4,411,964 | 10/1983 | Hara et al. | 428/626 |
| 4,581,090 | 4/1986 | Snyder | 427/140 |

OTHER PUBLICATIONS

The *Handbook of Adhesives* by Irving Skeist pp. 6-16 (1977).

*Primary Examiner*—Edith Buffalow
*Attorney, Agent, or Firm*—Christensen, O'Connor, Johnson & Kindness

[57] ABSTRACT

A method of coating polymeric substrates, and in particular vinyl coverings, to rennovate and enhance the appearance of the substrate. The coating composition employed to restore and enhance the substrate, preferably comprises an acrylic polymer, benzotriazole, and a solvent therefor. The composition can also be used as a sealant to close small gaps or openings.

9 Claims, No Drawings

PROTECTIVE, DECORATIVE AND RESTORATIVE COATING COMPOSITION AND METHOD

BACKGROUND OF THE INVENTION

This application is a continuation-in-part of prior copending application Ser. No. 735,595, filed May 20, 1985 now U.S. Pat. No. 4,612,236, which in turn is a divisional application of prior application Ser. No. 537,335, filed Sept. 29, 1983, now U.S. Pat. No. 4,529,487 issued July 16, 1985, the benefit of the filing dates of which are hereby claimed under 35 U.S.C. 120.

The present invention relates to a polymer coating that protects and aesthetically enhances polymeric substrates such as vinyl fabrics or coverings. Vinyl coverings are placed on a variety of surfaces to decorate those surfaces. For example, vinyl covering is applied to the roof tops of automobiles and other articles to give the appearance of a convertible top or to otherwise provide a textured covering for the articles. As vinyl coverings are exposed to sunlight and the elements, they tend to oxidatively degrade, losing their original luster and good appearance.

SUMMARY OF THE INVENTION

The present invention provides a method and product for restoring, protecting and enhancing the appearance of polymeric substrates such as a vinyl covering comprising the steps of applying to the polymeric substrate a composition comprising an acrylic polymer, benzotriazole, and a solvent therefore. As the solvent evaporates, the combination of the acrylic polymer and the benzotriazole restore the appearance of the vinyl covering to a condition that is near the original appearance. Moreover, the coating serves as a protective layer that tends to prevent rapid degradation of the enhanced appearance over a relatively long period of time. The acrylic polymer/benzotriazole/solvent composition can also function as a gap bridging sealant for use not only on polymeric coatings, but in other applications where conventional sealants are employed.

DETAILED DESCRIPTION OF THE INVENTION

The present invention can be employed with virtually any vinyl covering or other polymeric substrate subject to oxidative deterioration and physical degradation upon use and exposure to weathering by an outside environment. The present invention is especially effective with vinyl-covered substrates, such as the vinyl polymer coated fabric employed as a decorative covering for automobile roofs. When the coating is applied in accordance with the present invention, the original appearance is virtually restored, enhancing its overall beauty. Moreover, the coating protects the underlying substrate from oxidation and even mild mechanical damage. The polymeric component of the coating composition is chosen from the class of thermoplastic polymers or copolymers generally referred to as acrylic polymers. This class includes polymers made from acrylic acid, methacrylic acid, esters of these acids, such as methylmethacrylate, and acrylonitrile. A preferred material is the methylmethacrylate polymer sold under the "Acryloid" trademark, product designation B44 and B48N by the Rohm & Haas Company of Philadelphia, Pa.

Normally, acrylic polymers are sold in a liquid solution. Typical solvents for the polymers include toluene. Normal solubilizers such as methylcellosolve are included in the polymer solution. For example, the Acryloid B44 resin contains approximately 40% by weight based on the total solution of solids (polymer) while the Acryloid B48N polymer contains approximately 45% by weight solids. Solubilizer normally constitutes from 2% to 4% by weight of the solution, while the balance of the solution is solvent.

When applying the acrylic polymers to a substrate in accordance with the present invention, it is usually preferred to dilute the commercially available solution with additional solvent such as toluene. Lower alcohols such as ethanol and isopropanol can also be readily employed. Other usable solvents include aromatic hydrocarbons, 2-methoxyethanol and lower esters and ketones. When a commercial acrylic resin containing 40% solids is diluted to approximately 15% by weight solids, a thin coating on the order of 0.02 to 0.05 mil is obtained when the coating is spread with a brush over a substrate. By increasing the solids content to approximately 30% by weight, an increase in film thickness to about 1 mil is obtained. Preferably the solids content of the coating solution utilized in accordance with the present invention is maintained in the range of from 5% to 40% to provide adequate film thicknesses.

In addition to the solvent it is preferred to add an adhesion promoter to the polymer solution prior to its application to the substrate. The preferred adhesion promoter is benzotriazole. This corrosion inhibitor and adhesion promoter can be added in minor amounts to enhance the corrosion resistance characteristics of the final coated article. Benzotriazole can be added to the coating solution in amounts from about 0.01% to about 2% by weight based on the total coating solution.

In order to obtain a uniform coating, a leveling agent such as "Paraplex G-60" sold by the C.P. Hall Company of Chicago, Ill., is also added to the coating solution. Paraplex is an alkyd polyester resin that is based on long-chain polybasic acids esterified with polyhydric alcohol such as glycerol or ethylene glycol. Addition of leveling agents in amounts ranging from 0.1% to about 2% by weight based on the total coating solution will provide an even coating that exhibits a relatively uniform thickness.

An acrylic resin composition, especially the composition containing the corrosion inhibitor and adhesion promoter benzotriazole, surprisingly and unexpectedly enhances the aesthetic characteristics of a coated vinyl substrate. The coating provided by the composition is clear and transparent, thus enabling one to enhance the visual characteristics of substrates having a variety of colors. The coating also acts as a moisture barrier preventing moisture and oxygen from penetrating the polymeric substrate and causing rusting of a metallic base on which the substrate may be applied.

It has been found that the acrylic resin composition can also be used as a moisture barrier and a gap filling sealer. When the composition is applied to small cracks or openings, it bridges the crack or opening, thus, closing it and preventing moisture or other materials from passing through. Environments in which the sealant characteristics of the composition can be used include the spaces between automobile window seals and the window opening on the window itself. Other applications will be readily apparent.

While an acrylic polymer and solvent can be used alone as a sealant, it is preferred that benzotriazole be added in the amounts set forth above. The addition of a leveling agent will also promote the gap-bridging characteristics of the composition.

EXAMPLES

The following examples are included to assist one of ordinary skill in making and using the invention. They are intended as representative examples of the present invention and are not intended in any way to limit the scope of protection granted by Letters Patent hereon. All parts and percentages referred to in the following Examples are by weight unless otherwise indicated.

EXAMPLE 1

A coating composition was prepared comprising 400 g/l of methylmethacrylate copolymer (Acryloid B44), 500 ml/l toluene, 100 ml/l isopropanol, 5 g/l benzotriazole and 5 g/l of leveling agent (Paraplex G-60). The formulation was applied by a brush to a portion of a vinyl polymer coating on an eight-year-old automobile that had been exposed to an outside environment. The vinyl coating showed definite signs of weathering and fading. Before the coating was applied, the area was first cleaned with a commercial cleaner and dried. After the coating was applied, the coated area appeared lustrous and was restored to its original dark blue color. Adhesion of the coating was excellent and showed no signs of cracking and blistering. After several months of exposure to the outside environment, and fifteen washings, both by hand and by automatic car washing machines, the vinyl top appeared to be near-new.

EXAMPLE 2

The protective coating formulation of Example 1 without the benzotriazole and the leveling agent was applied to the vinyl top of a second seven-year-old automobile. The coating was first cleaned and then the protective coating applied by brush. The dark-bluish color of the coating was immediately rejuvenated. Adhesion was excellent. There were no indications of cracking, blistering, or the like. The car was washed many times over the next several months. The coated vinyl retained its lustrous new appearance.

EXAMPLE 3

The coating composition of Example 1 was applied to the area between the flexible seal on an automobile window and the car body around the window for the purpose of stopping a persistent water leak past the seal. An amount sufficient to bridge any gaps between the seal and the car body was applied. The gaps through which the water leaks occurred were bridged and closed. Composition flowed easily into the leakage area and adhered well. Intensive water hosing and use of the car in downpouring rain subsequent to applying the coating indicated that the leak had been stopped by application of the coating material.

In summary, the coating and sealing composition of the present invention has significant benefits. First, it has the capability of restoring and enhancing the appearance of vinyl surfaces coated by polymers such as vinyl fabrics. It has an excellent balance of hardness, corrosion protection, adhesion, toughness and transparency. The coating also has excellent resistance to ultraviolet light and yellowing with age. The coating also has a relatively lowcost. The coating also assists in the protection of the substrate underlying the vinyl-coated surface. It also can function as an effective sealer for small cracks, gaps and openings.

The present invention has been disclosed in connection with preferred embodiments thereof. One of ordinary skill will be able to effect various alterations, substitutions of equivalents and other changes without departing from the spirit and broad scope of the invention as disclosed. It is therefore intended that the scope of Letters Patent granted hereon be limited only to the definition contained in the appended claims and equivalents thereof.

The embodiments of the invention in which an exclusive property or priviledge is claimed are defined as follows:

1. A method for restoring the appearance of weathered vinyl covered surfaces, comprising the steps of:
   applying to a weathered vinyl covering a composition comprising an acrylic polymer and a solvent therefor.

2. The method of claim 1, wherein said composition further comprises an adhesion promoter.

3. The method of claim 1, wherein said composition further comprises a leveling agent.

4. The method of claim 2, wherein said adhesion promoter comprises benzotriazole.

5. The method of claim 4, wherein said composition further comprises an alkyd resin.

6. The method of claim 5, wherein said composition comprises 5% to 40% methylmethacrylate, up to 2% benzotriazole, up to 2% alkyd resin, and the balance of the composition comprising a solvent therefor.

7. The method of claim 5, wherein said solvent is selected from the group consisting of toluene, 2-methoxyethanol, lower alcohols, ketones, esters and aromatic hydrocarbons.

8. The method of claim 1 wherein said applying step comprises brushing said acrylic polymer and solvent therefor onto said weathered vinyl covering.

9. The method of claim 1 wherein said applying step comprises wiping said acrylic polymer and solvent therefor onto said weathered vinyl covering.

* * * * *

UNITED STATES PATENT AND TRADEMARK OFFICE
CERTIFICATE OF CORRECTION

PATENT NO. : 4,759,955
DATED : July 26, 1988
INVENTOR(S) : Grace F. Hsu and Richard C. Colonel It is certified that error appears in the above-identified patent and that said Letters Patent is hereby corrected as shown below:

Column 1, line 9: insert --,-- after "1985"
Column 1, line 53: insert --(polyvinyl chloride)-- after "polymer"

Column 4, line 26: "priviledge" should be --privilege--
Column 4, line 30: insert --comprising polyvinyl chloride-- after "covering"

Signed and Sealed this

Twenty-seventh Day of December, 1988

Attest:

DONALD J. QUIGG

*Attesting Officer*     *Commissioner of Patents and Trademarks*